March 10, 1953  J. H. ARMSTRONG  2,630,704
SQUARE WAVE SHOCK TESTER
Filed Feb. 3, 1950  2 SHEETS—SHEET 1

Inventor
J. H. ARMSTRONG
By M. C. Hayes
Attorney

March 10, 1953     J. H. ARMSTRONG     2,630,704
SQUARE WAVE SHOCK TESTER
Filed Feb. 3, 1950     2 SHEETS—SHEET 2

Inventor
J. H. ARMSTRONG
By M. C. Hayes
Attorney

Patented Mar. 10, 1953

2,630,704

UNITED STATES PATENT OFFICE 2,630,704

SQUARE WAVE SHOCK TESTER

John H. Armstrong, Washington, D. C.

Application February 3, 1950, Serial No. 142,244

10 Claims. (Cl. 73—12)

(Granted under Title 35, U. S. Code (1952), sec. 266)

This invention relates to a new and improved testing machine for performing a square wave test, and has particular relation to machines for testing objects that are to be subjected to shocks. More particularly this invention relates to a device which gives the object being tested accelerated motion having an acceleration versus time curve which is square in pattern. Through such testing an opinion may be formed as to whether or not the subsequent operation of the object will be affected by shocks produced by transportation and handling; whether any transient shock-induced effects may cause improper or premature operation; and under what conditions of impact the actuation of inertia-actuated devices will occur.

The old method of performing tests of this general type was to place the mechanism under test on a carriage which was dropped varying distances onto an anvil. Various cushioning elements such as lead pads of varying types and diameters were interposed between the striking surfaces to give some control over the duration of the shock. This method did not provide completely independent control of peak acceleration and shock duration. It was difficult to secure long duration shocks without simultaneously getting higher acceleration than desired and the acceleration-time record was likely to contain a high peak at the end of the shock which varied excessively from test to test under supposedly identical conditions.

The device of the present invention is fundamentally different from the drop test method in that a positive acceleration is secured on an initially stationary test carriage by an accelerating force applied by mechanical resilient means. The amount of this force and the weight of the carriage and its load determine the acceleration when the carriage is released. The duration of this acceleration is controlled by cutting off the accelerating force after the test carriage has traveled a predetermined distance. This new device enables recovery of the test carriage after application of shock with only minor disturbance compared to that from drop test carriage bouncing.

Broadly this invention operates on the principle that a constant force suddenly applied to an object, maintained for a period of time, and then suddenly removed, gives the object an acceleration versus time curve that is square in pattern. Tensioned spring means of a length sufficient to produce a substantially constant force over a predetermined distance of acceleration have been found to produce highly satisfactory results when utilized in accordance with the present invention.

It is an object of this invention to provide a testing machine which accelerates the object to be tested from a position of rest to a desired velocity by means of a substantially constant force existing for a predetermined time, and which accurately controls the cessation of said acceleration.

A further object is the provision of a device which enables the rapid determination of the response of inertia actuated devices to acceleration-time pulses of controllable amplitude and duration.

Another object is to provide means for varying the time period during which the object being tested is constantly accelerated independently of the accelerating force which is applied.

Another object is to provide means for varying the accelerating force which is applied to the object being tested independently of the time period during which the object is accelerated.

A further object is to provide a test machine which utilizes mechanical resilience to produce a controlled shock test.

A further object is to provide a test machine wherein the time duration of acceleration is controlled by arresting the accelerating structure by means of stationary stopping means.

Other objects and many of the attendant advantages of this invention will be readily appreciated as the same becomes better understood by reference to the following detailed description when considered in connection with the accompanying drawings wherein.

Figure 1:
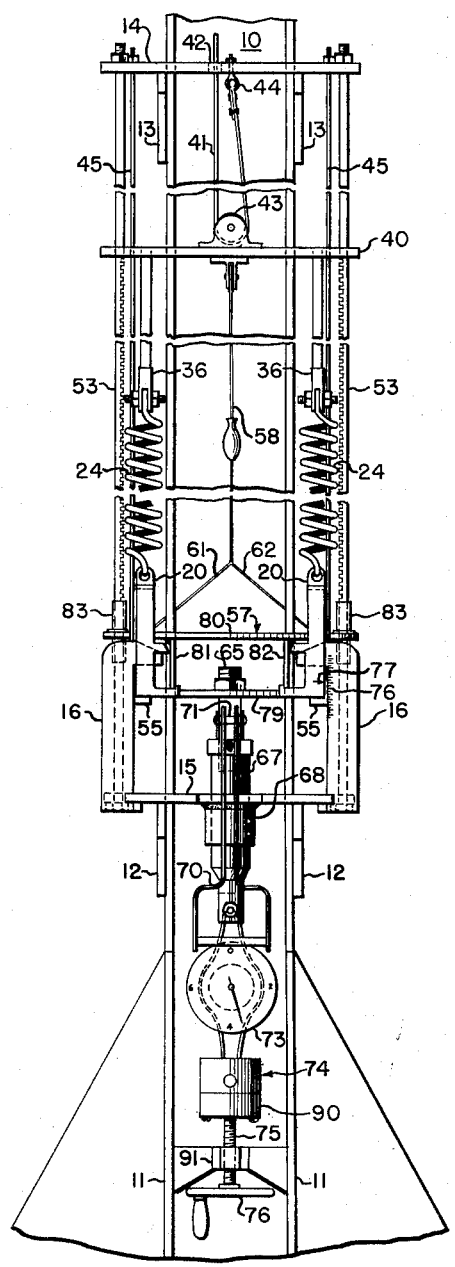
Fig. 1 is a front elevational view partly broken away of the instant invention according to a preferred embodiment thereof.
Figure 2:
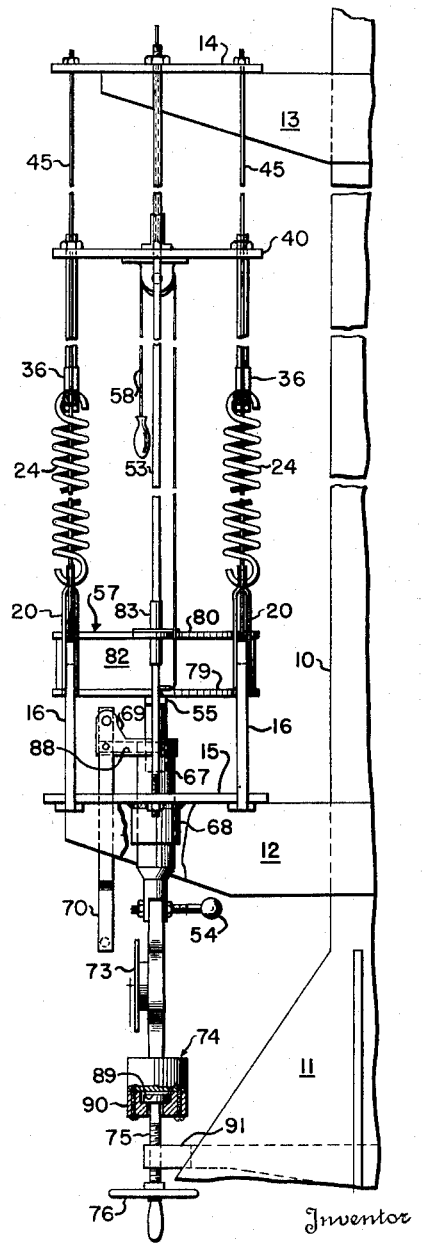
Fig. 2 is a side elevational view of the device of Fig. 1, part of which is in section and partly broken away.

Referring now to the drawings for a more complete understanding of the invention and more particularly to Figs. 1 and 2 thereof, the testing machine, which is shown in a preferred embodiment, comprises a frame member 10 having a base 11, lower arms 12 and upper arms 13. A top plate 14 is secured to the upper arms 13 and a bottom plate 15 is secured to the lower arms 12. Rigidly attached at the corners of the bottom plate 15 are four stopping fingers, designated by numeral 16, which engage and positively arrest upward movement of the four bifurcated spring hooks, designated by numeral 20. The four spring hooks 20 are accelerated upwardly toward the stopping fingers 16 by four springs, respectively designated by numeral 24, which are connected to the spring hooks 20 in any suitable manner, such as by looping through holes therein. The top end portions of the springs 24 are similarly connected to four rods, designated by numeral 36, the rods being rigidly connected to a movable plate 40 in any suitable manner, such as by nuts screwed on the ends thereof substantially as shown. A powered hoisting means (not shown) is constructed and arranged to elevate and lower the movable plate 40 by means of cable 41 which passes downwardly through hole 42 in the top plate 14, around pulley 43 mounted on the movable plate 40, and then upwardly through the eye-ring 44 depending from the under side of top plate 14 where it is secured in any convenient manner. Raising and lowering plate 40 alternately stresses and relieves springs 24.

The four safety rods, designated by numeral 45, which are connected to the top plate 14 and the stopping fingers 16 in any suitable manner, such as by welding, and which pass through holes in the movable plate 40, serve as guide and safety means for the springs since they are positioned inside the springs.

Figure 3:
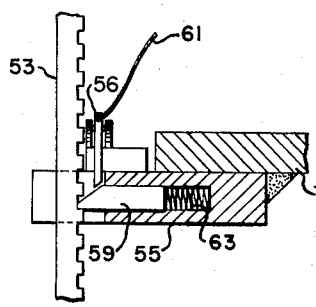
Fig. 3 is an enlarged view in section of the ratchet mechanism.

Also depending from the top plate 14 are two guide and ratchet rods designated by numeral 53 which coact with the two similar ratchet mechanisms designated by numeral 55, shown in section in Fig. 3, to guide the upward travel of the carriage and to prevent the carriage from sliding downward until the ratchets 55 have been manually released by operation of the release lanyard 58.

Figure 8:
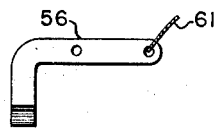
Fig. 8 is an enlarged elevational view of the ratchet release member.

The ratchet mechanisms 55 consist of similar parts and function by operation of release lanyard 58 which pivots the members 56 thereby forcing the catch members 59 inwardly away from the slots in the guide and ratchet rods 53. In Fig. 8 is shown a detailed elevational view of one of the two similar members 56. As seen in Fig. 1, the lanyard 58 is divided into two sections 61 and 62 which are secured to their respective members 56 through holes therein. Springs 63 bias the catch members 59 outwardly so that they slidably engage the slots in ratchet rods 53 when the carriage 57 is moving upwardly, and positively engage the slots to hold the carriage 57 subsantially at the height reached on ascent when the upward movement ceases.

The ratchet mechanisms 55, hereinbefore described, are housed in the bottom section 79 of the carriage 57, the carriage also consisting of a top section 80 and two spaced vertical sections 81 and 82. The top section 80 comprises the plate upon which the object to be shock tested may be fastened by means of metal straps and bolts or by other similar means not shown. Two guide tubes designated by numeral 83 are rigidly secured to the top section 80 and slidably engage the guide and ratchet rods 53.

Figure 4:
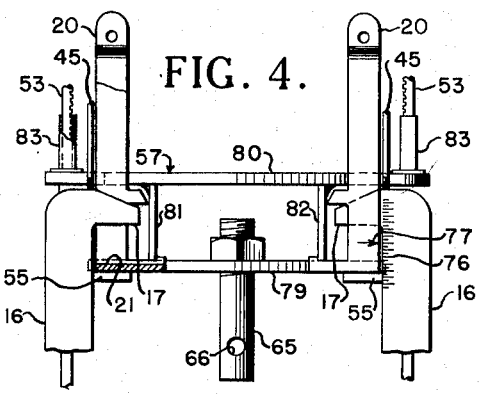
Fig. 4 is an enlarged view partly in section of the carriage, stopping fingers, and hooks.
Figure 5:
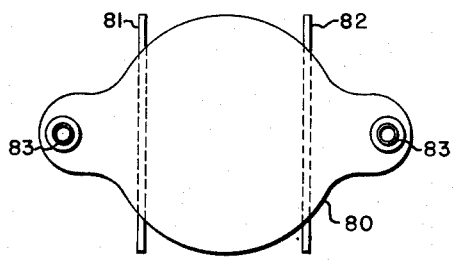
Fig. 5 is a top view of the carriage of Fig. 4.

As shown in Figs. 4 and 5, the spaced vertical sections 81 and 82 provide four spring hook engaging sections which are engaged by the spring hooks 20 when the springs 24 are placed under tension.

Figure 6:
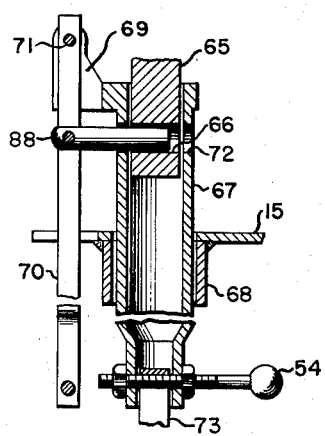
Fig. 6 is a view in section of the carriage releasing mechanism of the instant invention.

The base portion 79 of the carriage 57 has a depending member 65 fixed thereto which has a pin receiving hole 66 therethrough as best shown in Fig. 6. The hole 66 is horizontally located exactly through a center line of the carriage 57. A receiving cylinder 67 is slidably positioned in the bushing 68 in the bottom plate 15 for receiving the depending member 65 therein. Integral with the cylinder 67 is a member 69 which pivotally supports the release handle 70 at a point above the hole 66 by means of pin 71 which is positioned in aligned holes in member 69 and handle 70. A release pin 88 is pivotally mounted on said handle 70 and is positioned in a pin guiding hole 72 in the receiving cylinder 67 for slidable movement into and out of hole 66 in the carriage depending member 65.

The lower end of cylinder 67 has two aligned holes in which is secured an agitator or ditherer 54. The ditherer supports the upper end of a spring load dynamometer 73, which may be of any conventional type known to the art. By manually agitating the ditherer 54 as the tension in the springs 24 is increased, a more accurate reading on the dynamometer 73 is attained.

The lower end of the dynamometer 73 is attached to a swivel member 74, shown in section in Fig. 2 in which the upper bearing end 89 of a rod 75 is rotatably mounted by means of a retaining bearing ring 90 which is secured to the swivel member 74.

To facilitate the raising and lowering of the cylinder 67, the rod 75 is threaded intermediate the ends thereof to coact with a tapped hole in a portion 91 of the base 11. The lower end of rod 75 has a travel adjusting handwheel 76 fixedly secured thereto which is operable to adjust the distance through which the carriage 57 is accelerated by the springs 24 in a manner to be described in greater detail hereinafter.

Suitable scale means are provided for measuring the distance through which the carriage is subjected to the accelerating force. In the instant embodiment a scale 76 is mounted on one of the stopping fingers 16 and a pointer 77 is mounted on the adjacent spring hook 20.

To subject an object to an actual shock test the object may be secured to the top section 80 of carriage 57 in any suitable manner.

The pin receiving hole 66 in the carriage depending member 65 is vertically aligned with the pin guiding hole 72 in the receiving cylinder 67. By pivoting the handle 70 toward the frame member 10, the release pin 88 is moved into the receiving hole 66, thereby to releasaby hold the carriage from upward movement due to spring tension which is to be applied.

Proper operation of a lifting means, such as a powered hoisting means (not shown), raises the movable plate 40 by means of cable 41 which is attached thereto. The four springs 24 are thereby placed under tension to a controlled amount which is indicated by the spring load dynamometer 73. The reading on dynamometer 73 is the force in pounds which is to be used in accelerating the carriage and the object secured thereto through a predetermined distance. This predetermined distance is set by turning handwheel 76 which vertically moves the hooks 20 with respect to the fingers 16 whereby the pointer 77 may be aligned with the proper marking on scale 76.

When the handle 70 is pivoted away from frame member 10, the release pin 88 is moved out of hole 66 thereby allowing the four spring hoods 20, which are in lifting engagement with the hook engaging sections of carriage 57, to jerk the carriage 57 upwardly. When the stopping plates 21 of the hooks 20 strike the arresting arms 17 of the fingers 16, the spring force is removed from the carriage and the carriage immediately starts to decelerate and then comes to rest due to the effects of friction and gravity. The ratchet mechanisms 55 prevent the carriage assembly from falling after the test.

Figure 7:
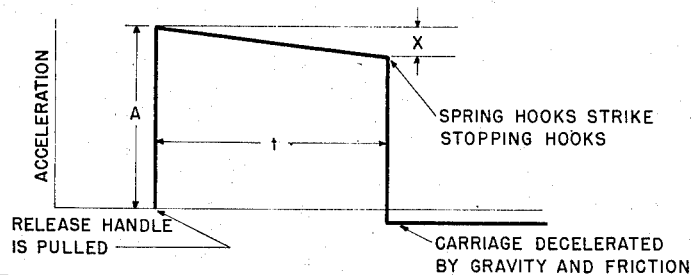
Fig. 7 is a graph illustrating the acceleration-time curve produced by the instant invention.

The formula $F = WA$ is used to calculate the acceleration where F is the force in pounds; W is the weight of the carriage assembly plus the moving parts; and A is the acceleration in "g." Knowing the acceleration the formula $d = \frac{1}{2}At^2$ is used to find the time where $d$ is the predetermined distance the carriage is accelerated by the springs; A is the acceleration; and $t$ is the time. These two formulae give values of acceleration and time which are used to plot the curve shown in Fig. 7 which is substantially square in shape, the decline X thereof being due to the slight decrease in acceleration as the springs contract. Since the stretch in the springs is very long in comparison to the distance over which they are accelerating the carriage assembly, the decrease in acceleration during the shock is only a small percentage of the peak acceleration, hence the "square" acceleration time pulse.

In the use of springs, rubber bands or other mechanical resilient means as a power means, it has been found desirable to protect the operator of the test machine from injury due to failure of the resilient means by enclosing the resilient means in suitable housing structures.

Obviously many other modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A shock testing machine comprising frame means, carriage means slidably mounted on the frame means, holding means for releasably securing the carriage means to the frame means, elastic means engaging the carriage means for accelerating the carriage means at a constant rate immediately upon release of the carriage means from the frame means and a dynamometer detachably connectible to said carriage means for indicating the force applied in stressing said elastic means.

2. A shock testing machine comprising frame means, carriage means slidably mounted on the frame means, holding means for releasably securing the carriage means to the frame means, elastic means engaging the carriage means for accelerating the carriage means at a constant rate immediately upon release of the carriage means from the frame means, a dynamometer detachably connectible to said carriage means for indicating the force applied in stressing said elastic means and means for instantly disengaging the elastic means from the carriage means after the carriage means has travelled a predetermined distance.

3. A shock testing machine comprising a frame, a guide rod mounted on said frame, a carriage slidably mounted on said guide rod, carriage holding and releasing means mounted on said frame for releasably connecting said carriage to said frame, means including elastic means connected to said carriage for accelerating said carriage on said guide rod at a constant rate when said carriage is disconnected from said frame, and a dynamometer detachably connectible to said carriage for indicating the force applied in stressing said elastic means.

4. A square wave shock tester comprising a frame, a guide rod mounted on said frame, a carriage slidably mounted on said rod, carriage holding and releasing means mounted on said frame for releasably connecting said carriage to said frame, a finger member mounted on said frame, and means including resilient power means securely connected to said frame and releasably connected to said carriage for accelerating said carriage at a constant rate immediately upon release of said carriage from said frame, said accelerating means also including resilient power stop means which collides with said finger member thereby detaching the accelerating means from said carriage.

5. A square wave shock tester comprising a frame having a stop member and a guide rod, releasing means connected to said frame member, a carriage slidably mounted on said guide rod and releasably connected to said frame by said releasing means, power storage means operatively connected to said carriage for supplying a substantially constant force thereto to provide a movement of constant acceleration upon release of said carriage, said power storage means having means which collides with the stop member to remove the constant force from the carriage after the carriage has travelled a predetermined distance.

6. A square wave shock tester comprising a frame having a plurality of stop members and a plurality of guide rods fixedly attached thereto, a releasing means connected to said frame member, a carriage slidably mounted on said plurality of guides and releasably connected to said frame by said releasing means, and a plurality of mechanical resilient power storage means operatively connected to said carriage for supplying a substantially constant force thereto immediately upon release of said carriage to provide a movement of constant acceleration thereto, said storage means including a plurality of means which upon movement of the carriage through a predetermined distance coact with said stop members to instantly remove said force from said carriage.

7. A square wave shock tester comprising a frame having a plurality of stop members and a plurality of guide rods fixedly attached thereto, a carriage slidably mounted on said guide rods, carriage holding means pivotally mounted on said frame for releasable engagement with the carriage, a plurality of resilient means each having carriage engaging hooks adapted to exert a substantially constant force on said carriage to provide a substantially constant acceleration when said holding means is disengaged from the carriage, and stopping means which coact with said hooks when the carriage has travelled a predetermined distance to disengage the hooks from the carriage thereby removing said force from the carriage.

8. A square wave shock tester comprising a frame having a plurality of stop members and a plurality of vertical guide rods fixedly attached thereto, a carriage mounted for vertical movement on said guide rods, a plurality of hooks in lifting engagement with said carriage and aligned for collision with said stop members to disengage said hooks from the carriage, vertical resilient means connected to said hooks and having means for varying the force of said resilient means, and carriage holding means adjustably mounted on the frame for vertical movement with respect to said stop members whereby the distance the carriage is moved vertically upward by the substantially constant predetermined force may be controlled.

9. A square wave shock tester comprising a frame having a plurality of stop members and a plurality of vertical guide rods fixedly attached thereto, a carriage mounted for vertical movement on said guide rods, carriage holding means mounted on said frame for releasably restraining the carriage from vertical movement, resilient means having hook means at the lower ends thereof in releasable engagement with said carriage and adjustable means at the upper ends thereof for regulating the tension force of said resilient means, said hook means being adapted to accelerate the carriage vertically upwards at a substantially constant rate until the hook means collide with said stop members, and means for adjusting the distance between said carriage when restrained and said stationary stop members whereby the distance through which said carriage is accelerated may be controlled.

10. A square wave shock tester comprising a frame having a plurality of stop members and a plurality of vertical guide rods fixedly attached thereto, a carriage slidably mounted on said guide rods, adjustable means for releasably holding said carriage at predetermined distances from said stop members, resilient means having hook means in releasable engagement with said carriage and having a controlled power supply means for varying the tension force of said resilient means on said carriage, a spring load dynamometer so constructed and arranged as to indicate the exact vertical force applied to said carriage, said hook means being in vertical alignment with said stop members whereby upon release of said carriage from said adjustable means said hook means collide with said stop members thereby releasing the carriage from said hook means.

JOHN H. ARMSTRONG.

REFERENCES CITED

The following references are of record in the file of this patent:

UNITED STATES PATENTS

| Number | Name | Date |
|---|---|---|
| 333,635 | Ingersoll | Jan. 5, 1886 |
| 463,259 | Estrada | Nov. 17, 1891 |
| 513,590 | Morris | Jan. 30, 1894 |
| 1,604,141 | Amsler | Oct. 26, 1926 |
| 2,217,492 | Peachey | Oct. 8, 1940 |